United States Patent [19]

Ishii

[11] Patent Number: 4,950,303

[45] Date of Patent: Aug. 21, 1990

[54] COLOR-LOADED POLYMER MICROPARTICLES

[75] Inventor: Keizou Ishii, Hyogo, Japan

[73] Assignee: Nippon Paint Co., Ltd, Osaka, Japan

[21] Appl. No.: 128,267

[22] Filed: Dec. 3, 1987

[51] Int. Cl.$^5$ .............................. C08J 3/20; C09B 69/02
[52] U.S. Cl. .............................................. 8/513; 8/654; 8/657; 8/676; 8/680; 523/406; 523/418; 523/421; 525/123; 528/290
[58] Field of Search ..................... 8/513, 657, 658, 659

[56] References Cited

U.S. PATENT DOCUMENTS

| | | | |
|---|---|---|---|
| 4,116,912 | 9/1978 | Miziguchi et al. | 524/512 |
| 4,322,324 | 3/1982 | Mizueuchi et al. | 528/290 |
| 4,379,872 | 4/1983 | Ishikura et al. | 523/406 |
| 4,382,800 | 5/1983 | Wang et al. | 8/404 |
| 4,453,943 | 6/1984 | Balliello | 8/524 |
| 4,461,870 | 7/1984 | Kanda et al. | 525/123 |
| 4,465,491 | 8/1984 | Balliello et al. | 8/524 |
| 4,468,493 | 8/1984 | Ishikura et al. | 525/123 |
| 4,713,083 | 12/1987 | Okuzono et al. | 8/557 |
| 4,728,543 | 3/1988 | Kurauchi et al. | 427/407.1 |

FOREIGN PATENT DOCUMENTS 2144752 3/1985 United Kingdom .

*Primary Examiner*—A. Lionel Clingman
*Attorney, Agent, or Firm*—Burns, Doane, Swecker & Mathis

[57] ABSTRACT

Water-soluble dyes are loaded on polymer microparticles having a particle size of 0.01 to 50 microns. The carrier polymer microparticles are produced by emulsion polymerizing a mixture of at least one monofunctional monomer with a crosslinking monomer in the presence of a polymerizable amino acid derivative or a hydrophilic oligomer having a plurality of amphoionic groups. Water-soluble dyes are added to the resulting emulsion. Color-loaded polymer microparticles are obtained by removing water from the emulsion followed by resuspending in an organic solvent.

7 Claims, No Drawings

COLOR-LOADED POLYMER MICROPARTICLES

BACKGROUND OF THE INVENTION

This invention relates to a new colorant for use in paint and other coating compositions. It also relates to a method for preparing the same.

Japanese Laid-Open Patent Application (Kokai) No. 139471/80 discloses an ink jet recording composition comprising colored polymer microparticles prepared by admixing an aqueous emulsion of internally crosslinked polymer of ethylenically unsaturated monomers with a disperse dye, and then heating the mixture. Although the crosslinked polymer microparticles themselves are not soluble both in water and in organic solvents, the disperse dye carried by the polymer microparticles are not soluble in water but soluble in organic solvents. Accordingly, it is impossible to incorporate the colored microparticles into commonly used solvent-type paint vehicles.

A need therefore continues to exist for color-loaded polymer microparticles which are capable of compounding into solvent-type paint or other coating compositions.

SUMMARY THE INVENTION

I have found that water-soluble dyes may be unreleasably loaded onto the surfaces of internally crosslinked polymer microparticles when the polymer constituting the microparticles contains a plurality of amphoionic groups covalently bonded or physically adhered thereto. The polymer microparticles have a particle size of 0.01 to 50 microns and are prepared by emulsion polymerizing a mixture of at least one ethylenically unsaturated monofunctional monomer and a crosslinking monomer. The amphoionic groups may be bound to the polymer molecule by incorporating an amphoionic monomer into the starting monomer mixture. Alternatively, the amphoionic group-bearing polymer microparticles may be prepared by emulsion polymerizing the monomer mixture in the presence of an amphoionic group-containing emulsifier or dispersant.

The color-loaded polymer microparticles of the present invention may be prepared by admixing the resulting polymer emulsion with an aqueous solution of desired water-soluble dye, removing water from the mixture, and then resuspending the dyed polymer microparticles in a suitable organic solvent. Unless the carrier polymer microparticles have a plurality of amphoionic groups covalently bonded or physically adhered thereto, the water-soluble dye will be released very easily.

CARRIER POLYMER MICROPARTICLES

The internally crosslinked polymer microparticles used as a carrier for water-soluble dyes in the present invention are produced by emulsion polymerizing a mixture of (a) at least one ethylenically unsaturated monofunctional monomer and (b) a crosslinking monomer.

Examples of monofunctional monomers include carboxyl group-containing monomers such as acrylic, methacrylic, crotonic, itaconic, maleic and fumaric acids; hydroxy group-containing monomers such as 2-hydroxyethyl acrylate, 2-hydroxyethyl methacrylate, hydroxypropyl acrylate, hydroxypropyl methacrylate, hydroxybutyl acrylate, hydroxybutyl methacrylate, allyl alcohol and methallyl alcohol; nitrogen atom-containing acrylates or methacrylates such as dimethylamino ethyl acrylate or methacrylate; polymerizable amides such as acrylamide and methacrylamide; polymerizable nitriles such as acrylonitrile and methacrylonitrile; alkyl acrylates or methacrylates such as methyl acrylate, methyl methacrylate, ethyl acrylate, n-butyl acrylate, n-butyl methacrylate and 2-ethylhexyl acrylate; polymerizable glycidyl compounds such as glycidyl acrylate or methacrylate; polymerizable aromatic compounds such as styrene, α-methylstyrene, vinyltoluene or t-butylstyrene; α-olefins such as ethylene and propylene; vinyl compounds such as vinyl acetate and vinyl propionate; and diene compounds such as butadiene and isoprene. Mixtures of these monofunctional monomers may also be used.

Crosslinking comonomers include a monomer having at least two ethylenically unsaturated bonds per molecule and the combination of two different monomers having mutually reactive groups.

Monomers having at least two polymerization sites may typically be represented by esters of a polyhydric alcohol with an ethylenically unsaturated monocarboxylic acid, esters of an ethylenically unsaturated monoalcohol with a polycarboxylic acid and aromatic compounds having at least two vinyl substituents. Specific examples thereof include ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetracrylate, pentaerythritol dimethacrylate, pentaerythritol trimethacrylate, pentaerythritol tetramethacrylate, glycerol diacrylate, glycerol allyloxy dimethacrylate, 1,1,1-tris(hydroxymethyl)ethane diacrylate, 1,1,1-tris(hydroxymethyl)ethane triacrylate, 1,1,1-tris(hydroxymethyl)ethane dimethacrylate, 1,1,1-tris(hydroxymethyl)ethane trimethacrylate, 1,1,1-tris(hydroxymethyl)propane diacrylate, 1,1,1-tris(hydroxymethyl)propane triacrylate, 1,1,1-tris(hydroxymethyl)propane dimethacrylate, 1,1,1-tris(hydroxymethyl)propane trimethacrylate, triallyl cyanurate, triallyl isocyanurate, triallyl trimellitate, diallyl phthalate, diallyl terephthalte and divinyl benzene.

Combinations of two monomers having mutually reactive groups may be used in place of, or in addition to monomers having two or more polymerization sites. For example, monomers having a glycidyl group such as glycidyl acrylate or methacrylate may be combined with carboxyl group-containing monomers such as acrylic, methacrylic or crotonic acid. Other examples of the combination of mutually reactive groups include amine/carbonyl, epoxide/carboxylic acid anhydride, alkyleneimine/carbonyl, amine/carboxylic acid chloride, organo-alkoxysilane/carboxyl and hydroxyl/isocyanate.

A plurality of amphoionic groups may be covalently bonded to the polymer microparticles by copolymerizing a polymerizable amino acid of the formula:

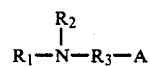

wherein $R_1$ is a group containing ethylenic unsaturation, $R_2$ is H, or an unsubstituted or substituted $C_1$–$C_6$ hydrocarbon radical, $R_3$ is an unsubstituted or substituted $C_1$–$C_6$ divalent hydrocarbon radical, and A is —COOH or —$SO_3M$, with other monomers constituting the polymer microparticles. This method is disclosed in Japanese Laid-Open patent application (Kokai) No. 139111/82 and U.S. Pat. No. 4,468,493, both assigned to the assignee of this application, which disclosures are incorporated herein by reference.

Polymer microparticles having a plurality of amphoionic groups may also be produced by emulsion polymerizing the starting monomer mixture using an amphoionic group-containing acrylic, polyester or epoxy resin, for example, a hydrophilic polymer containing a plurality of amphoionic groups, as an emulsifier or dispersant in the emulsion polymerization. This method is disclosed in Japanese Laid-Open patent application (Kokai) No. 187302/82. Acrylic resins having a plurality of amphoionic groups may be prepared, as disclosed in Japanese Laid-Open patent application No. 71864/82, by copolymerizing the above-mentioned polymerizable amino acid with one or more monofunctional comonomers free of the amino acid structure using the solution or emulsion polymerization technique. Amphoionic group-containing polyester or alkyd resins are disclosed is Japanese Laid-Open patent application (Kokai) Nos. 34725/81, 51727/81, and U.S. Pat. No. 4,322,324. Amphoionic group-containing modified epoxy resins are disclosed in Japanese Laid-Open patent application No. 40522/82 and U.S. Pat. No. 4,379,872.

In particular, the emulsion polymerization of the starting mixture can take place in the presence of a hydrophilic acrylic, polyester, alkyd, or epoxy oligomer having the plurality of amphoionic groups of the formula:

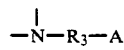

wherein $R_3$ is an unsubstituted or substituted $C_1$–$C_6$ divalent hydrocarbon radical, and A is —COOH or —$SO_3M$.

These water-soluble resins having the amphoionic groups are physically adhered to the polymer microparticles. However, these resins may be covalently bound to the polymer microparticles, if desired, by introducing an ethylenically unsaturated function and then copolymerizing with monomer mixture constituting the polymer microparticles. This may be effected, for example, by reacting glycidyl acrylate or methacrylate with a free carboxyl group remaining in the amphoionic group-containing acrylic or polyester resins. Amphoionic group-containing epoxy resins may be rendered reactive or copolymerizable by reacting acrylic acid or methacrylic acid with the remaining epoxide group.

The emulsion polymerization may be performed using any standard technique except that the above-mentioned polymerizable amino acid or amphoionic group-containing emulsifier or dispersant is incorporated into the reaction system.

The amount of polymerizable amino acids may range between 0.5 and 100 parts, preferably between 1 and 50 parts per 100 parts by weight of the starting monomer mixture. The amount of amphoionic group-containing resins may range between 0.3 and 400 parts, preferably 0.5 and 100 parts per 100 parts by weight of the starting monomer mixture.

The particle size of the resulting polymer microparticles is controlled within a range between 0.01 and 50 microns, preferably between 0.01 and 1 micron. The finer particle size gives the greater surface area available for loading dyes and is therefore the better.

LOADING OF WATER-SOLUBLE DYES

The carrier polymer microparticles thus prepared have a plurality of amphoionic groups on their surfaces. Accordingly, a variety of water-soluble dyes may be loaded onto the carrier microparticles in an unreleasable form through ionic bonds between the amphoionic group and an acidic or basic group such as sulfonic acid group and amino group possessed by the dye.

Non-limiting examples of water-soluble dyes having sulfo- or amino group include C.I. (Color Index) Direct Yellow 1, 4, 8, 12, 26, 44 and 50; C.I. Acid Yellow 17, 23, 25, 38, 42 and 44; C.I. Food Yellow 3; C.I. Basic Yellow 1, 2, 3, 11 and 12; C.I. Mordant Yellow 1, 3 and 30; C.I. Reactive Yellow 2, 3, 10, 14, 16 and 17; C.I. Direct Orange 8, 10, 26 and 29; C.I. Acid Orange 7, 8, 10, 20 and 56; C.I. Basic Orange 2 and 14; C.I. Mordant Orange 1 and 6; C.I. Reactive Orange 1; C.I. Direct Red 1, 2, 4, 7, 10, 13, 17, 20, 23, 24, 26, 28, 31, 37, 39, 46, 75, 79, 80, 81 and 83; C.I. Acid Red 1, 7, 9, 12, 14, 18, 26, 27, 35, 37, 51, 52, 73, 85, 87, 88, 92, 94, 99,115 and 186; C.I. Basic Red 1 and 2; C.I. Mordant Red 7 and 9; C.I. Reactive Red 1, 4, 7, 12, 17 and 23; C.I. Direct Violet 1, 7, 9, 12, 22, 47, 48 and 51; C.I. Acid Violet 7, 11, 15, 17, 34 and 56; C.I. Basic Violet 1, 3, 10 and 14; C.I. Mordant Violet 1, 5 and 16; C.I. Reactive Violet 5; C.I. Direct Blue 15, 22, 25, 41, 67, 71, 78, 84, 86, 98, 106, 120 and 168; C.I. Acid Blue 3, 7, 9, 22, 23, 43, 45, 47, 74, 83, 92, 102, 116, 117, 120, 158 and 161; C.I. Basic Blue 1, 5, 9 and 26; C.I. Mordant Blue 1, 8 and 13; C.I. Reactive Blue 1, 2, 4, 5 and 7; C.I. Direct Green 1, 3, 6, 8, 13, 24, 26, 28, 33, 34, 51 and 59; C.I. Acid Green 1, 3, 5, 9, 12, 16, 19, 25, 35 and 45; C.I. Basic Green 4; C.I. Mordant Green 9, 15 and 26; C.I. Direct Brown 1, 2, 6, 25, 33, 59, 95, 101, 106 and 112; C.I. Acid Brown 2; C.I. Basic Brown 1; C.I. Mordant Brown 1, 13, 15, 19, 33, 35, 40 and 42; C.I. Direct Black 4, 17, 19, 22, 32, 38, 51, 71, 74, 78 and 95; C.I. Acid Black 1, 2, 24, 31, 48 and 52; C.I. Mordant Black 1, 5, 7 and 17; C.I. Reactive Black 1 and 5; C.I. Fluor. Bright. Agent 30, 32, 33, 34, 41, 48, 52 and 112. Mixtures of two or more dyes may also be loaded.

These water-soluble dyes are added to the emulsion of carrier microparticles as an aqueous solution. Thereafter, water is removed from the mixture and the loaded polymer microparticles are resuspended in an organic solvent used in the paint industry. The amount of dyes to be loaded may vary within a wide range but is generally from 0.5 to 10 parts by weight per 100 parts of the emulsion of carrier microparticles.

The resulting loaded polymer microparticles may be incorporated as a colorant into conventional coating formulations containing a film-forming polymer, a crosslinker and an organic solvent.

The following examples illustrate the invention. All parts and percents therein are by weight unless otherwise indicated.

EXAMPLE 1

A reactor having stirring means was charged with 316 parts of deionized water. A solution of 4.5 parts of azobiscyanovaleric acid and 4.9 parts of triethylamine in 45 parts of deionized water was added to the reactor with stirring while maintaining the inner temperature at 80° C. Then a first mixture consisting of 20 parts of N-2-hydroxydodecylN-(vinylbenzyl)taurine, 2.4 parts of triethylamine and 90 parts of deionized water and a second mixture consisting of 67 parts of methyl methacrylate, 10 parts of 2-hydroxyethyl methacrylate, 4 parts of N,N-dimethylaminopropyl methacrylate, 51 parts of n-butyl acrylate and 40 parts of ethyleneglycol dimethacrylate were concurrently added dropwise over 60 minutes. After the addition of the first and second mixtures, a solution of 1.5 parts of azobiscyanovaleric acid in 15 parts of deionized water containing 1.6 parts of triethylamine was added. The mixture was stirred for additional 60 minutes at 80° C. to give an emulsion of polymer microparticles having a particle size of 0.03 microns.

EXAMPLE 2

153.3 parts of deionized water placed in a flask having stirring means and a thermometer were heated to 80° C. Then a solution of 2 parts of ammonium persulfate in 20 parts of deionized water was added. To this were added dropwise a first mixture of 2 parts of N-(3-sulfopropyl)-N-methacryloxyethyl-N,N-dimethylammonium betaine, 2 parts of 2-acrylamido-2-methylpropanesulfonic acid and 50 parts of deionized water, and a second mixture of 10 parts of lauryl methacrylate, 50 parts of methyl methacrylate, 26 parts of n-butyl acrylate and 10 parts of ethylene glycol dimethacrylate over 80 minutes. After the addition, a solution of 0.5 parts of ammonium persulfate in 10 parts of deionized water was added at the same temperature. The mixture was stirred for additional 60 minutes at 80° C. to give an emulsion of polymer microparticles having a particle size of 0.16 microns.

EXAMPLE 3

To a two liter flask having stirring means, a reflux condenser, temperature-control means, a nitrogen gas-introducing tube and a decanter were added 134 parts of N,N-bis(hydroxyethyl)taurine, 130 parts of neopentyl glycol, 236 parts of azelaic acid, 186 parts of phthalic anhydride, and 27 parts of xylene. The mixture was refluxed and water was removed as an azeotropic mixture with xylene. The temperature was raised to 190° C. over 2 hours and the reaction was continued with stirring until an acid number of 145 was reached.

The reaction product was cooled to 140° C. and 314 parts of CARDURA E-10 (glycidyl versatate, Shell Chemical Company) was added dropwise over 30 minutes at 140° C. The reaction was continued for additional two hours with stirring. A polyester resin having an acid number of 59, a hydroxyl number of 90 and a number average molecular weight ($\overline{Mn}$) of 1054 was obtained.

To a one liter flask equipped with stirring means, cooling means and temperature-control means were added 197 parts of deionized water, 20 parts of the above polyester resin and 2 parts of dimethylethanolamine. The mixture was stirred at 80° C. to make a solution. To the solution was added a solution of 1 part of azobiscyanovaleric acid in 20 parts of deionized water containing 0.9 parts of dimethylethanolamine. Then a monomer mixture consisting of 20 parts of styrene, 20 parts of methyl methacrylate, 20 parts of n-butyl acrylate, 5 parts of 2-hydroxyethyl acrylate, 5 parts of 2-(N'-2-ethylhexylureido)ethyl methacrylate and 30 parts of ethyleneglycol dimethacrylate was added dropwise over 60 minutes. After the addition of monomer mixture, a solution of 0.5 parts of azobiscyanovaleric acid in 15 parts of deionized water containing 0.4 parts of dimethylethanolamine was added. The mixture was stirred for additional 60 minutes at 80° C. to give an aqueous dispersion of polymer microparticles having a particle size of 0.03 microns.

EXAMPLE 4

18 parts of C.I. Acid Black 2 were added to 220 parts of emulsion prepared in Example 1 and thoroughly mixed. The emulsion was spray dried. 20 parts of dried particles were dispersed in a solvent mixture consisting of 40 parts of butyl acetate, 30 parts of toluene and 10 parts of ethylene glycol monomethyl ether. The dispersion was filtered through a filter paper to give a dark blue, stable dispersion having a solid content of 19%.

EXAMPLE 5

7 parts of C.I. Basic Red were thoroughly mixed with 180 parts of emulsion prepared in Example 2. To this were added 120 parts of xylene and water was removed by azeotropic distillation with xylene while adding xylene in portions. After filtering through a filter paper, a semi-transparent, fluorescent red dispersion having a solid content of 14% was obtained.

EXAMPLE 6

2 parts of C.I. Basic Red were thoroughly mixed with 180 parts of emulsion prepared in Example 3. The emulsion was spray dried to remove water to give a red powder. 25 parts of this powder were resuspended in 75 parts of methyl isobutyl ketone in a disperser. The resulting dispersion was filtered through a filter paper to give a red dispersion having a solid content of 25%.

EXAMPLE 7

50 parts of dyed dispersion obtained in Example 4 were mixed with 60 parts of DIANAL HR-595 (acrylic resin sold by Mitsubishi Rayon Co., Ltd.) and 15 parts of YUBAN 20 SE (melamine resin sold by Mitsui Toatsu Chemicals, Inc.) in a disperser. The resulting composition was applied on a glass plate to a dry film thickness of 50 microns using a doctor blade, and baked at 140° C. for 25 minutes. The resulting semi-transparent, dark blue film had a good appearance.

EXAMPLE 8

10 parts of dyed dispersion obtained in Example 5 were mixed with 30 parts of xylene, 70 parts of BEK-KOZOL 1307-EL (alkyd resin sold by Dainippon Ink And Chemicals, Inc.) and 30 parts of YUBAN 128 (melamine resin sold by Mitsui Toatsu Chemicals, Inc.). The resulting composition was applied on a glass plate to a dry film thickness of 50 microns using a doctor blade, and baked at 140° C. for 25 minutes. The resulting transparent, fluorescent red film had a good appearance.

What is claimed is:

1. A method for dyeing a polymeric carrier with a water-soluble dye which comprises emulsion polymerizing a mixture of (a) at least one ethylenically unsaturated monomer, (b) a crosslinking monomer comprising a monomer having at least two ethylenically unsaturated bonds per molecule or a combination of two different monomers which have mutually reactive groups, and (c) an amino acid derivative of the formula:

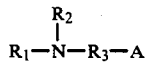

wherein $R_1$ is a group containing a polymerizable ethylenically unsaturated hydrocarbon moiety, $R_2$ is H, or an unsubstituted or substituted $C_1$-$C_6$ hydrocarbon radical, $R_3$ is an unsubstituted or substituted $C_1$-$C_6$ divalent hydrocarbon radical, and A is —COOH or —$SO_3H$, admixing the resulting emulsion with an aqueous solution of said water-soluble dye, removing water from the emulsion and resuspending the resulting dyed polymer microparticles in an organic solvent.

2. A method for dyeing a polymer carrier with a water-soluble dye which comprises emulsion polymerizing a mixture of at least one ethylenically unsaturated monomer and crosslinking monomer which comprises a monomer having at least two ethylenically unsaturated bonds per molecule or a combination of two different monomers which have mutually reactive groups wherein the emulsion polymerization occurs in the presence of an emulsifier comprising a hydrophilic acrylic, polyester, alkyd or epoxy oligomer having a plurality of amphoionic groups of the formula:

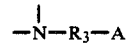

wherein $R_3$ is an unsubstituted or substituted $C_1$-$C_6$ divalent hydrocarbon radical, and A is —COOH or —$SO_3M$, admixing the resulting emulsion with an aqueous solution of said water-soluble dye, removing water from the emulsion and resuspending the resulting dyed polymer microparticles in an organic solvent.

3. The method according to claim 2, wherein said hydrophilic oligomer has at least one group containing an ethylenically unsaturated hydrocarbon moiety capable of copolymerization with said monomer mixture.

4. The method according to claim 1, wherein the amount of said amino acid derivative is from 0.5 to 100 parts per 100 parts by weight of said monomer mixture.

5. The method according to claim 4, wherein the amount of said water-soluble dye is from 0.5 to 10 parts per 100 parts by weight of said emulsion.

6. The method according to claim 2, wherein the amount of said hydrophilic oligomer is from 0.3 to 400 parts per 100 parts by weight of said monomer mixture.

7. The method according to claim 6, wherein the amount of said water-soluble dye is from 0.5 to 10 parts per 100 parts by weight of said emulsion.

* * * * *